United States Patent
Makii

(10) Patent No.: US 7,409,150 B2
(45) Date of Patent: Aug. 5, 2008

(54) LENS DRIVING MECHANISM, LENS UNIT AND IMAGE PICKUP DEVICE

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 373 days.

(21) Appl. No.: 11/384,255

(22) Filed: Mar. 21, 2006

(65) Prior Publication Data

US 2006/0227437 A1    Oct. 12, 2006

(30) Foreign Application Priority Data

Mar. 28, 2005  (JP)  ............... 2005-092157

(51) Int. Cl.
*G03B 17/00* (2006.01)
*H04N 5/232* (2006.01)

(52) U.S. Cl. ............ 396/55; 359/824; 348/208.4; 348/208.5; 348/208.7; 348/208.99

(58) Field of Classification Search ............ 396/52–55; 359/822–824, 554; 348/208.1–208.6, 208.13, 348/208.16, 208.99, 351–352

See application file for complete search history.

(56) References Cited

U.S. PATENT DOCUMENTS 6,940,542 B2 * 9/2005 Kitazawa et al. ....... 348/208.99

FOREIGN PATENT DOCUMENTS

JP    2000-066257    3/2000

* cited by examiner

*Primary Examiner*—Bot LeDynh
(74) *Attorney, Agent, or Firm*—Rader Fishman & Grauer PLLC; Ronald P. Kananen

(57) ABSTRACT

Disclosed herein is a lens driving mechanism which can achieve simplification of the mechanism and provision of appropriate control relating to a correction against a shake. The lens driving mechanism includes a piezoelectric element that is deformed when energized for applying driving force to the movable block and a charge amount sensor for detecting the amount of charge accumulated in the piezoelectric element. The amount of electric current to be supplied to the piezoelectric element is determined based on the external force, acting upon the movable block, which is estimated based on the difference between the amount of charge injected into or discharged from the piezoelectric element and the amount of charge accumulated in the piezoelectric element and detected by the charge amount sensor when the movable block is moved in the direction perpendicular to the optical axis.

3 Claims, 5 Drawing Sheets

LENS DRIVING MECHANISM, LENS UNIT AND IMAGE PICKUP DEVICE

CROSS REFERENCES TO RELATED APPLICATIONS

The present invention contains subject matter related to Japanese Patent Application JP 2005-092157 filed in the Japanese Patent Office on Mar. 28, 2005, the entire contents of which are incorporated herein by reference.

BACKGROUND OF THE INVENTION

This invention relates to a lens driving mechanism, a lens unit and an image pickup device.

A lens unit wherein an image pickup optical system including a movable lens and a lens driving mechanism for moving the movable lens are disposed in a lens barrel is incorporated not only in video cameras and still cameras but also in various image pickup devices of portable telephone sets and like devices. The movable lens cooperates with a lens holder which holds the movable lens thereon to form a movable block. The movable block is moved by the lens driving mechanism in a direction perpendicularly to the optical axis to a perform correction against a shake.

One of such lens driving mechanisms, as described above, uses a linear actuator formed from a driving coil, a driving magnet and so forth as disclosed, for example, in Japanese Patent Laid-open No. 2000-66257.

SUMMARY OF THE INVENTION

However, since in such an image pickup device in the related art as described above, a linear actuator formed from a driving coil, a driving magnet and so forth is used for the lens driving mechanism, the image pickup device has a problem in that it requires a complicated structure and an increased arrangement space due to the arrangement of the driving coil, the driving magnet and so forth, resulting in an increase of the scale of the image pickup device.

Further, the image pickup device in related art described above also has a problem in that the number of parts is great and the mechanism is complicated because it includes not only an acceleration sensor for detecting a shake but also a MR (Magneto Resistance) sensor and so forth for detecting the position of a movable block.

Further, the amount of shaking of the movable block is calculated based on an output value detected by a detection section, such as an acceleration sensor, and the movable block is moved in a direction perpendicular to the optical axis by a shake correction amount corresponding to the amount of shaking by the lens driving mechanism. Therefore, open loop control is used for the control for moving the movable block by the shake correction amount based on the amount of shaking.

Accordingly, since the control does not have a real time responsibility, for example, if self-excited vibration occurs with the lens driving mechanism or in a like case, there is the possibility that a correction against a shake may not be performed appropriately.

It is desirable to provide a lens driving mechanism, a lens unit and an image pickup device which can achieve the simplification of the mechanism and the provision of appropriate control relating to the correction against a shake.

According to the present invention, the amount of charge accumulated in a piezoelectric element for moving a movable block is detected and an energization amount for the piezoelectric element is determined based on the detected charge amount.

In particular, according to an embodiment of the present invention, there is provided a lens driving mechanism for moving a movable block including a movable lens in a direction perpendicular to an optical axis of the movable lens to perform a correction against a shake, including a piezoelectric element that is deformed when energized for applying a driving force to the movable block and a charge amount sensor for detecting the amount of charge accumulated in the piezoelectric element, wherein the amount of electric current to be supplied to the piezoelectric element is determined based on the external force acting upon the movable block, which is estimated based on the difference between the amount of charge injected into or discharged from the piezoelectric element and the amount of charge accumulated in the piezoelectric element and detected by the charge amount sensor when the movable block is moved in the direction perpendicular to the optical axis.

In the lens driving mechanism, the piezoelectric element is energized in response to the deformation state of the piezoelectric element caused by the displacement of the movable block acted upon by an external force.

Accordingly, with the lens driving mechanism, simplification and miniaturization of the mechanism can be anticipated closed loop control can be achieved readily, and besides, control relating to the correction against a shake can be achieved appropriately.

According to another embodiment of the present invention, there is provided a lens unit including a movable block including a movable lens and a lens driving mechanism for moving the movable block in a direction perpendicular to an optical axis of the movable lens to perform a correction against a shake, wherein the lens driving mechanism includes a piezoelectric element that is deformed when energized for applying driving force to the movable block and a charge amount sensor for detecting the amount of charge accumulated in the piezoelectric element, wherein the amount of electric current to be supplied to the piezoelectric element is determined based on the external force acting upon the movable block, which is estimated based on the difference between the amount of charge injected into or discharged from the piezoelectric element and the amount of charge accumulated in the piezoelectric element and detected by the charge amount sensor when the movable block is moved in the direction perpendicular to the optical axis.

In the lens unit, the piezoelectric element is energized in response to the deformation state of the piezoelectric element caused by the displacement of the movable block acted upon by the external force.

Accordingly, with the lens unit, simplification and miniaturization of the mechanism can be anticipated, closed loop control can be achieved readily, and besides, control relating to the correction against a shake can be achieved appropriately.

According to a further embodiment of the present invention, there is provided an image pickup device including a movable block including a movable lens and a lens driving mechanism for moving the movable block in a direction perpendicular to an optical axis of the movable lens to perform a correction against a shake, an image pickup optical system, and an image pickup element for converting an image formed by the image pickup optical system into an electric signal, wherein the lens driving mechanism includes a piezoelectric element that is deformed when energized for applying a driving force to the movable block and a charge amount sensor for detecting the amount of charge accumulated in the piezoelectric element, and wherein the amount of electric current to be supplied to the piezoelectric element is determined based on the external force acting upon the movable block, which is estimated based on a difference between the amount of charge injected into or discharged from the piezoelectric element and the amount of charge accumulated in the piezoelectric element and detected by the charge amount sensor when the movable block is moved in the direction perpendicular to the optical axis.

In the image pickup device, the piezoelectric element is energized in response to the deformation state of the piezoelectric element caused by the displacement of the movable block acted upon by an external force.

Accordingly, with the image pickup device, simplification and miniaturization of the mechanism can be anticipated, closed loop control can be achieved readily, and besides, control relating to the correction against a shake can be achieved appropriately.

The above and other objects, features and advantages of the present invention will become apparent from the following description and the appended claims taken in conjunction with the accompanying drawings in which like parts or elements are denoted by like reference symbols.

DETAILED DESCRIPTION OF THE PREFERRED EMBODIMENTS

Figure 1:
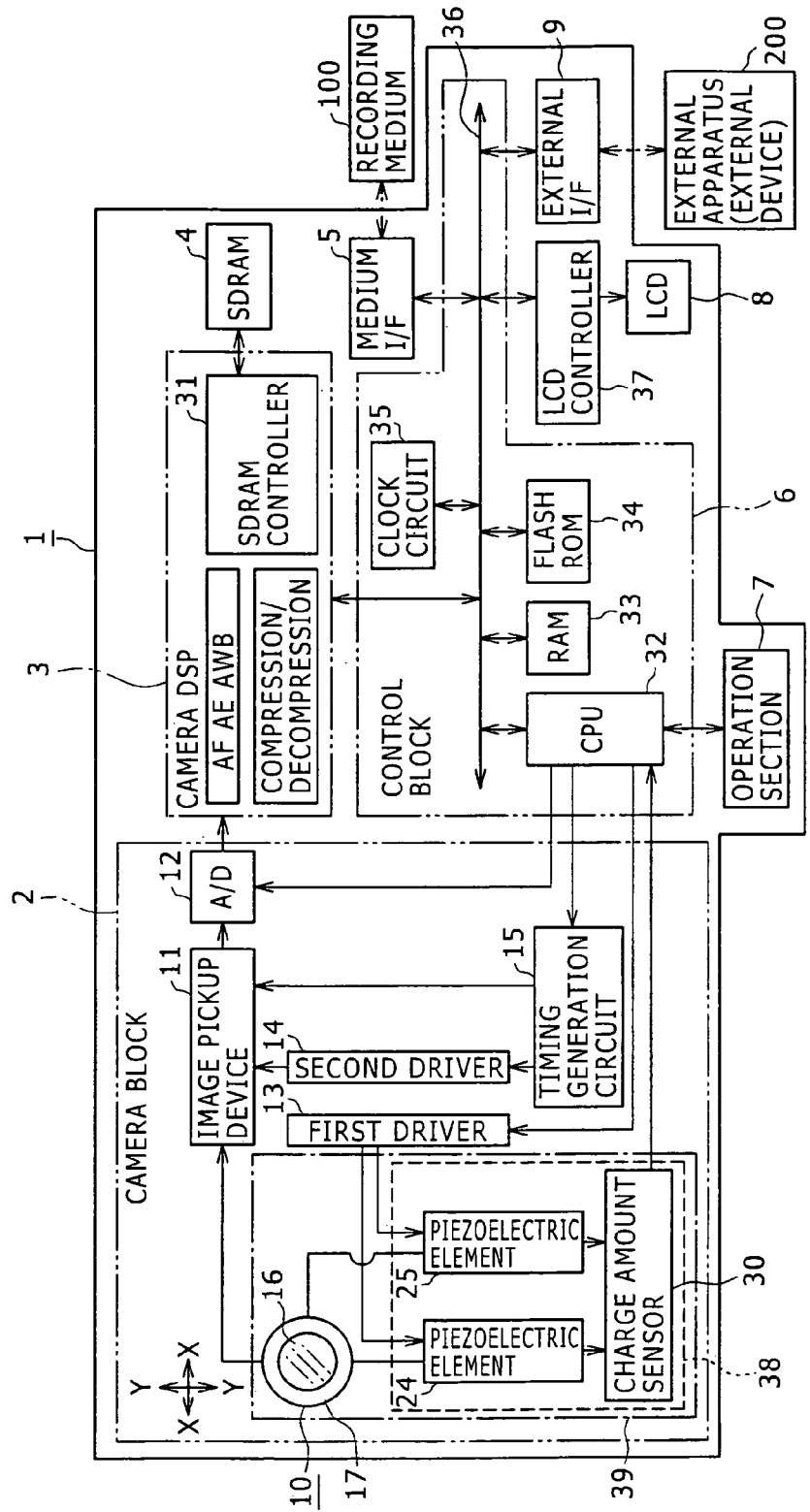
FIG. 1 is a block diagram showing a general configuration of an image pickup device to which the present invention is applied.

Although the present invention can be applied to various image pickup devices which have a moving picture image pickup function or a still picture image pickup function, such as portable telephone sets, video cameras and still cameras, and also to various lens units and lens driving mechanisms used in such image pickup device, a general configuration of an image pickup device to which the present invention is described first with reference to FIG. 1.

The image pickup device 1 includes a camera block 2, a camera DSP (Digital Signal Processor) 3, a SDRAM (Synchronous Dynamic Random Access Memory) 4, a medium interface (I/F) 5, a control block 6, an operation section 7, a LCD (Liquid Crystal Display) unit 8 and an external interface (I/F) 9. A recording medium 100 can be removably loaded into the external interface 9.

For the recording medium 100, various media can be used, including memory cards in which a semiconductor memory is incorporated and disk-type recording media such as a recordable DVD (Digital Versatile Disk) and a recordable CD (Compact Disk).

The camera block 2 includes a movable block 10, an image pickup device 11, such as a CCD (Charge Coupled Device) image pickup device, an A/D conversion circuit 12, a first driver 13, a second driver 14 and a timing generation circuit 15.

Figure 2:
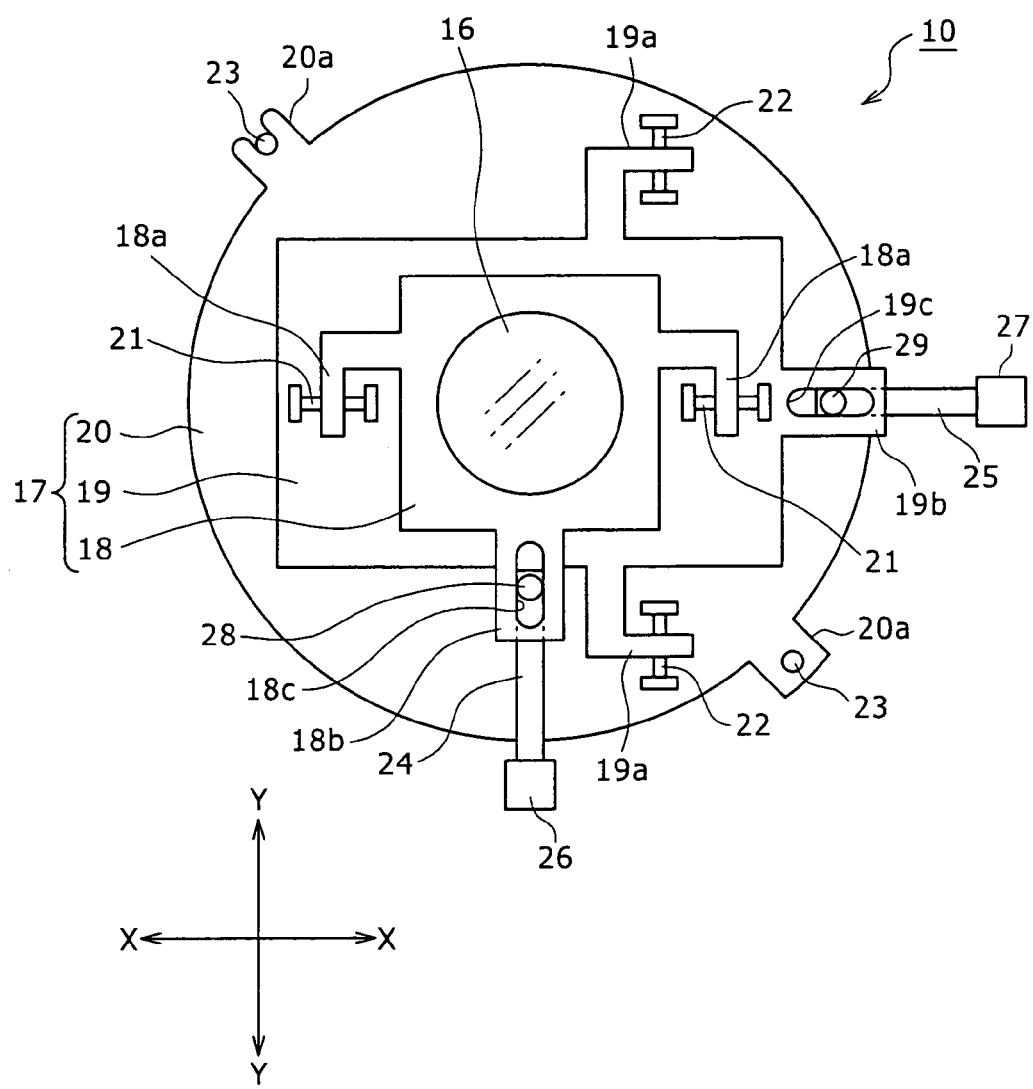
FIG. 2 is an enlarged schematic front elevational view, partly in section, showing a piezoelectric element before it is deformed together with a movable block of the image pickup device.

The movable block 10 includes a movable lens 16 such as, for example, a focusing lens and a zoom lens, and a lens holder 17 for holding the movable lens 16 thereon, as particularly shown in FIG. 2.

Referring to FIG. 2, the lens holder 17 includes, for example, a lens holding member 18, a movable base 19 and a support base 20.

The movable lens 16 is attached to and held by the lens holding member 18, and a pair of arm portions 18a are provided on the lens holding member 18 such that they project leftwardly and rightwardly. Further, a projection 18b is provided on the lens holding member 18 such that it projects, for example, downwardly, and an upwardly and downwardly elongated support hole 18c is formed in the projection 18b.

A pair of arm portions 19a are provided on the movable base 19 such that they project, for example, upwardly and downwardly. Further, a projection 19b is provided on the lens holding member 18 such that it projects, for example, rightwardly, and a leftwardly and rightwardly elongated sliding hole 19c is formed in the projection 19b. A pair of support shafts 21 are provided on the movable base 19 and extend leftwardly and rightwardly, and the arm portions 18a of the lens holding member 18 are supported for sliding movement on the support shafts 21. Accordingly, the lens holding member 18 can be moved in the leftward and rightward directions (X direction in FIG. 2) with respect to the movable base 19.

A pair of sliding shafts 22 are provided on the support base 20 such that they extend upwardly and downwardly, and the arm portions 19a of the movable base 19 are supported for sliding movement on the sliding shafts 22. Accordingly, the movable base 19 can be moved in the upward and downward directions (Y direction in FIG. 2) with respect to the support base 20. When the movable base 19 is moved in the Y direction with respect to the support base 20, the lens holding member 18 also is moved in the Y direction integrally with the movable base 19.

A pair of bearing portions 20a are provided on the support base 20 such that they individually project outwardly and are supported for sliding movement on a pair of guide shafts 23 which extend in the direction of the optical axis. The support base 20 can be moved in the direction of the optical axis under the guidance of the 23, and when the support base 20 is moved in the direction of the optical axis, the lens holding member 18 and the movable base 19 also are moved in the direction of the optical axis integrally with the support base 20.

Referring back to FIG. 1, the image pickup device 11 operates in response to a driving signal from the second driver 14 and fetches an image of a subject fetched through the movable lens 16. Then, the image pickup device 11 signals the fetched image (image information) of the subject as an electric signal to the A/D conversion circuit 12 in response to a timing signal outputted from the timing generation circuit 15, which is controlled by the control block 6.

It is to be noted that the image pickup device 11 is not limited to a CCD device, but some other device such as, for example, a CMOS (Complementary Metal-Oxide Semiconductor) device can be used as the image pickup device 11.

The A/D conversion circuit 12 performs a CDS (Correlated Double Sampling) process for the image information as the inputted electric signal to maintain a good S/N ratio and performs an AGC (Automatic Gain Control) process to control the gain. The A/D conversion circuit 12 further performs an A/D (Analog/Digital) conversion process to produce image data in the form of a digital signal.

The first driver 13 signals a driving signal to a piezoelectric element, hereinafter described, in accordance with an instruction of a CPU, hereinafter described, of the control block 6.

The second driver 14 signals a driving signal to the image pickup device 11 based on a timing signal outputted from the timing generation circuit 15.

The timing generation circuit 15 generates a timing signal for providing a predetermined timing under the control of the control block 6.

The camera block 2 includes a pair of piezoelectric elements 24 and 25 which function as driving sections for moving the movable block 10, for example, in the XY directions perpendicular to an optical axis (refer to FIG. 2). In particular, the piezoelectric element 24 functions as a driving section for moving the movable block 10, for example, in the X direction, and the piezoelectric element 25 functions as a driving section for moving the movable block 10, for example, in the Y direction.

Each of the piezoelectric elements 24 and 25 is deformed in a substantially fixed radius of curvature when it is energized. At this time, charge is accumulated into the piezoelectric element 24 or 25. Each of the piezoelectric elements 24 and 25 is secured at an end portion thereof to a fixed member 26 or 27 and is deformed in a direction corresponding to the X or Y direction. It is to be noted that the fixed members 26 and 27 may be disposed on the support base 20. Alternatively, the fixed member 26 may be disposed on the movable base 19 while the fixed member 27 is disposed on the support base 20.

While piezoelectric elements are roughly classified into the bimorph type and the unimorph type, for example, a bimorph type piezoelectric element is used as the piezoelectric elements 24 and 25 of the camera block 2. It is to be noted, however, that alternatively the piezoelectric elements 24 and 25 may be of the unimorph type.

Referring to FIG. 2, engaging pins 28 and 29 are attached to the other end portions of the piezoelectric elements 24 and 25, respectively. The engaging pins 28 and 29 are supported for sliding movement in the support hole 18c of the lens holding member 18 and the sliding hole 19c of the movable base 19, respectively.

A charge amount sensor 30 is provided on the camera block 2. The charge amount sensor 30 detects the amount of charge accumulated in each of the piezoelectric elements 24 and 25 and is incorporated, for example, in a detection circuit (not shown). An output of the charge amount sensor 30 is inputted to a CPU of the control block 6, hereinafter described.

The camera DSP 3 performs signal processing for image data inputted thereto from the A/D conversion circuit 12, such as AF (Automatic Focusing), AE (Automatic Exposure) and AWB (Auto White Balancing). Image data for which the signal processing such as AF, AE and AWB has been performed are compressed by a predetermined method and outputted to the recording medium 100 through the control block 6 so that they are recorded as a file on the recording medium 100.

The camera DSP 3 includes a SDRAM controller 31 and performs writing and reading of data at a high speed into and from the SDRAM 4 in accordance with an instruction of the SDRAM controller 31.

The control block 6 is a microcomputer formed from a CPU (Central Processing Unit) 32, a RAM (Random Access Memory) 33, a flash ROM (Read Only Memory) 34, a clock circuit 35 and other circuits connected to each other through a system bus 36. The control block 6 has a function of controlling the components of the image pickup device 1.

The CPU 32 signals an instruction signal to the first driver 13 and signals an instruction signal to the second driver 14 and so fourth through the timing generation circuit 15 so that the components may operate. The CPU 32 receives information of the amounts of charge accumulated in the piezoelectric elements 24 and 25 and detected by the charge amount sensor 30 as an input thereto and outputs an instruction signal to the first driver based on the received information of the charge amounts.

Figure 3:
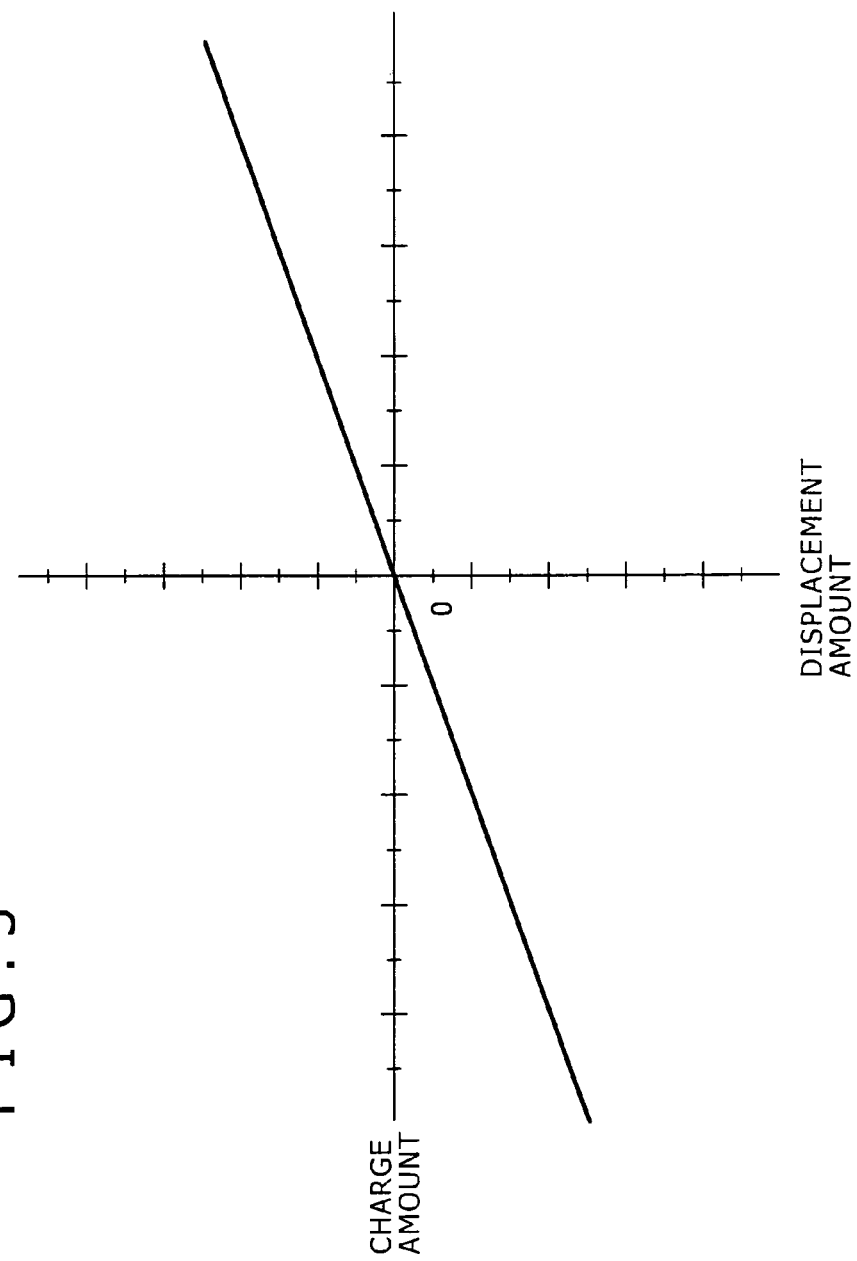
FIG. 3 is a graph illustrating a relationship between the displacement amount of the piezoelectric element and the charge amount detected by a charge amount sensor of the image pickup device.

FIG. 3 illustrates a relationship between the amount of displacement (deformation amounts) of the piezoelectric elements 24 and 25 and the amount of charge detected by the charge amount sensor 30.

As seen from FIG. 3, the displacement amount of the piezoelectric elements 24 and 25 has a proportional relationship to the charge amount accumulated in the piezoelectric elements 24 and 25. Further, the piezoelectric elements 24 and 25 have a characteristic that, if the piezoelectric elements 24 and 25 are deformed by the accumulated charge amount, then a charge of an amount which increases in proportion to the deformation amount is accumulated.

Accordingly, if the charge amount accumulated in each of the piezoelectric elements 24 and 25 is detected and the amount of charge injected into or discharged from the piezoelectric element 24 or 25 in response to the driving voltage applied to the piezoelectric element 24 or 25 is subtracted from the detected charge amount, then the amount of charge accumulated in the piezoelectric element 24 or 25 by external force can be calculated. It is to be noted that, if a driving voltage higher than a driving voltage that has been applied to the piezoelectric element 24 or 25 is applied, then a charge is injected into the piezoelectric element 24 or 25, but if a driving voltage lower than a voltage which has been applied to the piezoelectric element 24 or 25 is applied, then a charge is discharged from the piezoelectric element 24 or 25.

In this manner, where the piezoelectric elements 24 and 25 are used, the magnitude of external force applied to the movable block 10 by inertial force when shaking of the image pickup device 1 by hand occurs, that is, the amount of shaking of the image pickup device 1, can be estimated by detecting the charge amounts accumulated in the piezoelectric elements 24 and 25 that are deformed by displacement of the movable block 10. Accordingly, the piezoelectric elements 24 and 25 function not only as a driving section for moving the movable block 10 in the XY directions but also as a shaking detection section for detecting an amount of shaking which occurs with the movable block 10.

In the image pickup device 1, a relationship between the "difference between the charge amount injected into or discharged from the piezoelectric elements 24 and 25 and the charge amount accumulated in the piezoelectric elements 24 and 25 and detected by the charge amount sensor 30" and the "amount of shaking estimated to occur with the movable block 10" is stored as map information in the flash ROM 34 or the like in advance. Accordingly, upon image pickup by the image pickup device 1, the amounts of charge accumulated in the piezoelectric elements 24 and 25 are detected continuously by the charge amount sensor 30, and results of the detection are inputted as information of the charge amounts to the CPU 32. At this time, the map information described above is read out, and an instruction signal corresponding to a correction amount to be used for correction of the amount of shaking occurring with the movable block 10 is outputted from the CPU 32 to the first driver 13. Consequently, driving signals are outputted from the first driver 13 to the piezoelectric elements 24 and 25 in accordance with the instruction of the CPU 32 to apply necessary driving voltages to the piezoelectric elements 24 and 25.

The RAM 33 is used principally as a working area for temporarily storing intermediate results of processing and so forth.

The flash ROM 34 stores therein various programs to be executed by the CPU 32, data necessary for processes of the CPU 32 and so forth.

The clock circuit 35 outputs the present year, month and day, the present day of the week, the present hour, the date and hour of image pickup and so forth.

The operation section 7 includes a touch panel, control keys and so forth provided on a housing of the image pickup device 1. A signal corresponding to an operation of the operation section 7 is inputted to the CPU 32, and instruction signals are signaled from the CPU 32 to pertaining components of the image pickup device 1 based on the signal inputted thereto from the operation section 7.

The LCD unit 8 is provided, for example, on the housing and controlled by a LCD controller 37 connected to the system bus 36. The LCD unit 8 displays various kinds of information, such as image data, based on a driving signal from the LCD controller 37.

The external interface 9 is connected to the system bus 36. The image pickup device 1 is connected to an external apparatus 200 such as, for example, an external personal computer through the external interface 9 that it can receive image data from the personal computer and record the image data on the recording medium 100 or output image data recorded on the recording medium 100 to the personal computer or the like. It is to be noted that the recording medium 100 is connected to the control block 6 through the medium interface 5 connected to the system bus 36.

Further, where the external apparatus 200, for example, a communication module, is connected to the external interface 9, it is possible to connect the image pickup device 1 to a network such as, for example, the Internet and acquire various image data or other information through the network and record the data and/or information on the recording medium 100 or transmit data recorded on the recording medium 100 to an opposite party of communication through the network.

It is to be noted that it is possible to provide the external interface 9 as an interface for wire communication, such as an IEEE (Institute of Electrical and Electronics Engineers) 1394 interface, or a USB (Universal Serial Bus) interface or as an interface for wireless communication which makes use of light or radio waves.

Meanwhile, image data recorded on the recording medium 100 are read out from the recording medium 100 in response to an operation signal based on an operation of the operation section 7 performed by the user and signaled to the camera DSP 3 through the medium interface 5.

The camera DSP 3 performs a decompression process for image data in a compressed form read out from the recording medium 100 and inputted thereto and signals the decompressed image data to the LCD controller 37 through the system bus 36. The LCD controller 37 signals an image signal based on the received image data to the LCD unit 8. The LCD unit 8 displays an image thereon based on the received image signal.

In the image pickup device 1 having such a configuration as described above, the piezoelectric elements 24 and 25, engaging pines 28 and 29 and charge amount sensor 30 are components of a lens driving mechanism for controlling the movement of the movable block 10, and the lens driving mechanism and the movable block 10 are components of a lens unit 39 (refer to FIG. 1).

In the image pickup device 1, if a driving signal is outputted from the first driver 13 to the piezoelectric elements 24 and 25 in accordance with an instruction from the CPU 32, then a driving voltage is applied from a power supply circuit (not shown) to the piezoelectric elements 24 and 25, as described hereinabove.

Figure 4:
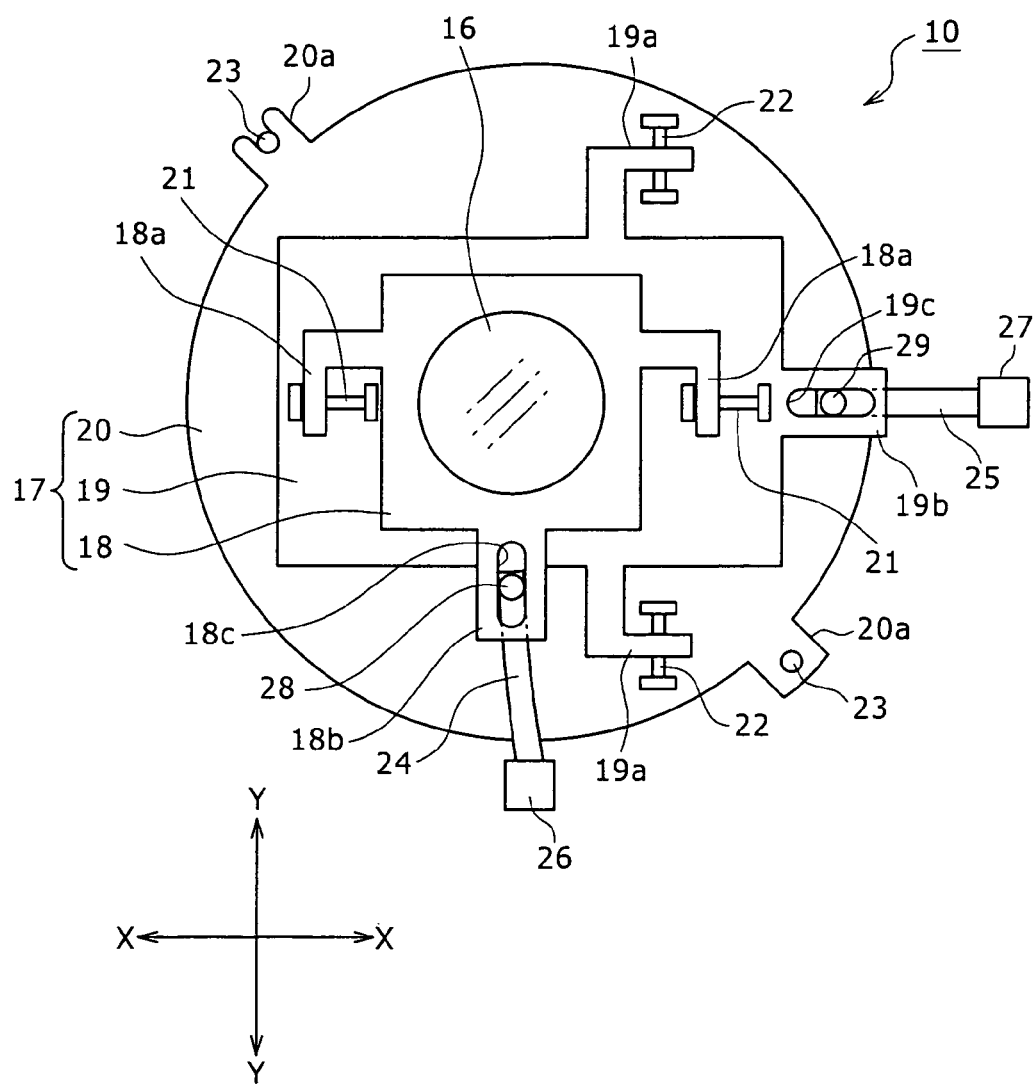
FIG. 4 is an enlarged schematic front elevational view, partly in section, showing the piezoelectric element after it is deformed and the movable block is moved in a X direction together with the movable block.
Figure 5:
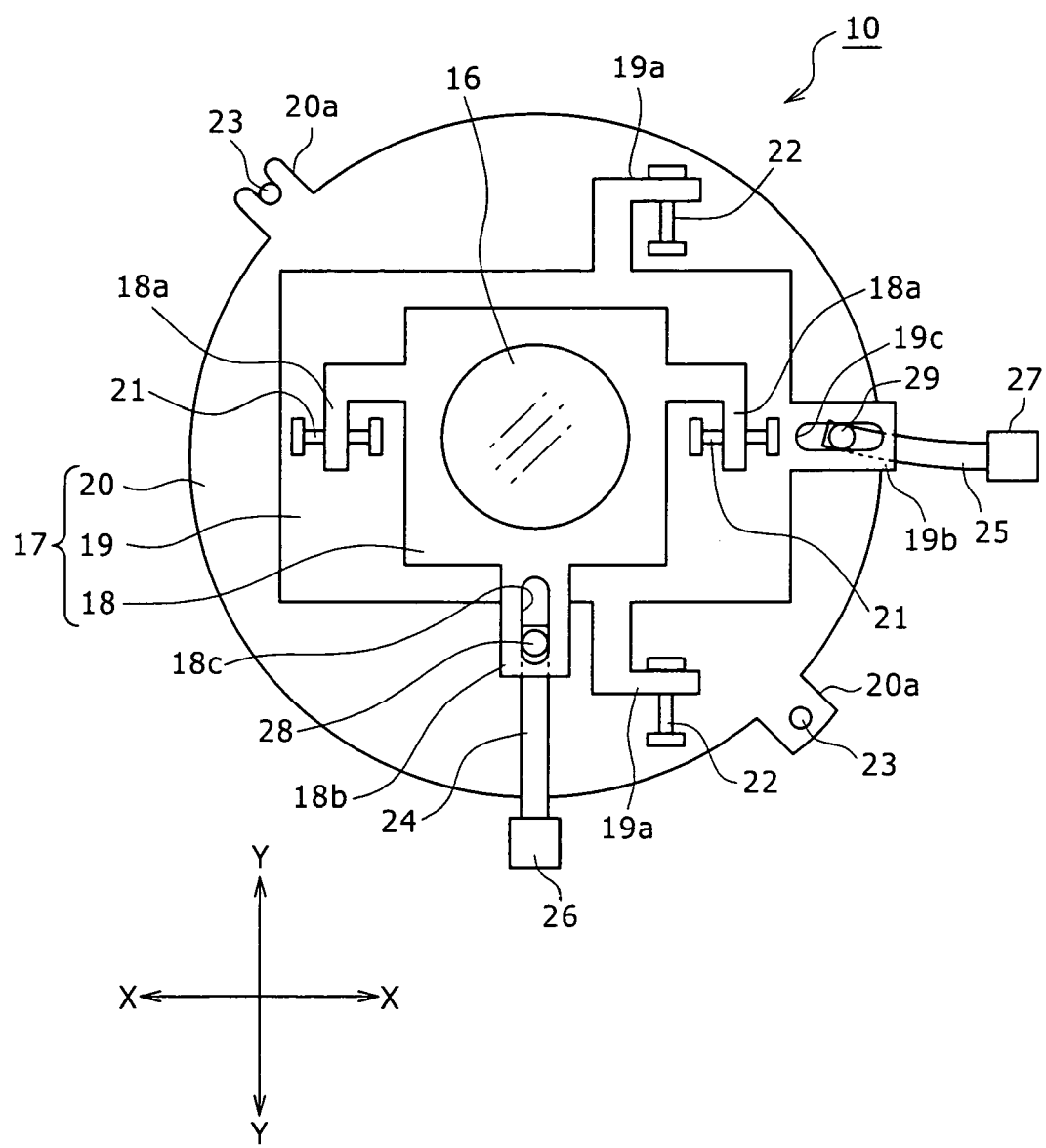
FIG. 5 is an enlarged, schematic, front elevational view, partly in section, showing the piezoelectric element after it is deformed and the movable block is moved in a Y direction together with the movable block.

When the driving voltage is applied to the piezoelectric elements 24 and 25, the piezoelectric elements 24 and 25 are deformed, and the movable block 10 is moved in the XY directions to perform a shaking correction operation (refer to FIGS. 4 and 5). Thereupon, the engaging pins 28 and 29 attached to the piezoelectric elements 24 and 25 slidably move in the support hole 19c of the lens holding member 19 and the sliding hole 20c of the movable base 20, respectively.

Since the piezoelectric elements 24 and 25 are used for the lens driving mechanism 38 in the image pickup device 1 as described above, simplification of the mechanism and reduction of the arrangement space can be achieved, and consequently, miniaturization can be anticipated.

Further, since the piezoelectric elements 24 and 25 are used commonly for the driving section for moving the movable block 10 and the detection section for detecting the shaking amount appearing with the movable block 10, closed loop control (feedback control) can be achieved readily and correction against a shake can be performed on a real time basis. Therefore, control relating to the correction against a shake can be performed appropriately.

It is to be noted that, while the movable block 10 in the image pickup device 1 described hereinabove is moved in the XY directions to perform a correction against a shake, it is otherwise possible to perform a correction against a shake only with regard to one of the X direction and the Y direction. In this instance, it is only necessary to use a corresponding one of the piezoelectric elements 24 and 25.

Further, while in the image pickup device 1 described hereinabove, the movable block 10 having a zoom lens or a focusing lens which is used in the direction of the optical axis is moved in a direction perpendicular to the optical axis to perform a correction against a shake, it is possible otherwise to use exclusively a lens which can be moved only in a direction perpendicular to the optical axis without moving in the direction of the optical axis as the lens for correction against a shake. The lens for correction against a shake in this instance need not be supported on the guide shafts 23.

It is to be noted that the upward and downward directions in the foregoing description are merely for the convenience of description, and the application of the present invention is not restricted by the directions.

While a preferred embodiment of the present invention has been described using specific terms, such description is for illustrative purposes only, and it is to be understood that changes and variations may be made without departing from the spirit or scope of the following claims.

What is claimed is:

1. A lens driving mechanism for moving a movable block including a movable lens in a direction perpendicular to an optical axis of said movable lens to perform a correction against a shake, comprising:
   a piezoelectric element that is deformed when energized for applying driving force to said movable block; and
   a charge amount sensor for detecting the amount of charge accumulated in said piezoelectric element;
   wherein the amount of electric current to be supplied to said piezoelectric element is determined based on the external force, acting upon said movable block, which is estimated based on the difference between the amount of charge injected into or discharged from said piezoelectric element and the amount of charge accumulated in said piezoelectric element and detected by said charge amount sensor when said movable block is moved in the direction perpendicular to the optical axis.

2. A lens unit, comprising:

a movable block including a movable lens; and a lens driving mechanism for moving said movable block in a direction perpendicular to an optical axis of said movable lens to perform a correction against a shake;

wherein said lens driving mechanism includes a piezoelectric element that is deformed when energized for applying driving force to said movable block, and a charge amount sensor for detecting the amount of charge accumulated in said piezoelectric element, wherein the amount of electric current to be supplied to said piezoelectric element is determined based on the external force acting upon said movable block, which is estimated based on a difference between the amount of charge injected into or discharged from said piezoelectric element and the amount of charge accumulated in said piezoelectric element and detected by said charge amount sensor when said movable block is moved in the direction perpendicular to the optical axis.

3. An image pickup device, comprising:

a movable block including a movable lens;

a lens driving mechanism for moving said movable block in a direction perpendicular to an optical axis of said movable lens to perform a correction against a shake; and an image pickup element for converting an image formed by an image pickup optical system into an electric signal;

wherein said lens driving mechanism includes a piezoelectric element that is deformed when energized for applying driving force to said movable block, and a charge amount sensor for detecting the amount of charge accumulated in said piezoelectric element, wherein the amount of electric current to be supplied to said piezoelectric element is determined based on the external force, acting upon said movable block, which is estimated based on a difference between the amount of charge injected into or discharged from said piezoelectric element and the amount of charge accumulated in said piezoelectric element and detected by said charge amount sensor when said movable block is moved in the direction perpendicular to the optical axis.

* * * * *